United States Patent
Yi et al.

(10) Patent No.: US 6,909,477 B1
(45) Date of Patent: Jun. 21, 2005

(54) LIQUID CRYSTAL DISPLAY DEVICE WITH AN INK-JET COLOR FILTER AND PROCESS FOR FABRICATING THE SAME

(75) Inventors: Jong Hoon Yi, Seoul (KR); Jeong Hyun Kim, Kyungki-do (KR); Sang Hun Oh, Seoul (KR); Soo Mahn Kim, Kyunggi-do (KR); Sang Gul Lee, Seoul (KR)

(73) Assignee: LG. Philips LCD Co., LTD, Seoul (KR)

( * ) Notice: Subject to any disclaimer, the term of this patent is extended or adjusted under 35 U.S.C. 154(b) by 0 days.

(21) Appl. No.: 09/492,802

(22) Filed: Jan. 28, 2000

(30) Foreign Application Priority Data

Nov. 26, 1998 (KR) .................................... P1998-50988
Jan. 29, 1999 (KR) ...................................... P1999-2958

(51) Int. Cl.[7] ........................................... G02F 1/1335
(52) U.S. Cl. ........................... 349/106; 349/43; 349/106
(58) Field of Search ............................. 349/42, 43, 106, 349/110; 430/7, 20

(56) References Cited

U.S. PATENT DOCUMENTS

| | | | | |
|---|---|---|---|---|
| 5,922,401 A | * | 7/1999 | Kashiwazaki et al. | 427/164 |
| 6,162,654 A | * | 12/2000 | Kawabe | 438/30 |
| 6,380,559 B1 | * | 4/2002 | Park et al. | 257/59 |
| 6,417,898 B1 | * | 7/2002 | Izumi | 349/73 |

* cited by examiner

Primary Examiner—Tarifur R. Chowdhury
Assistant Examiner—David Chung
(74) Attorney, Agent, or Firm—Birch, Stewart, Kolasch & Birch, LLP

(57) ABSTRACT

Barrier lines are formed on a substrate to define column areas between adjacent barrier lines. A color filter is then formed using continuous ink ejection in at least one of the column areas.

10 Claims, 14 Drawing Sheets

LIQUID CRYSTAL DISPLAY DEVICE WITH AN INK-JET COLOR FILTER AND PROCESS FOR FABRICATING THE SAME

BACKGROUND OF THE INVENTION

1. Field of the Invention

This invention relates to a liquid crystal display device, and more particularly to a liquid crystal display device using a color filter formed in an ink-jet printing system and a process of fabricating the same.

2. Description of the Related Art

Generally, a liquid crystal display device, widely used as a flat panel display of active matrix driving system, divides a light generated at a light source into light of three basic colors, red (R), green (G), and blue (B), so as to display a color picture. To this end, the liquid crystal display device requires a red (R) filter for transmitting the red light only, a green (G) filter for transmitting the green light only and a blue (B) filter for transmitting the blue light only for each picture element (or pixel). The R, G and B filters must not overlap with each other in order to prevent the deterioration of the picture and the color spread.

Methods of fabricating such a color filter for the liquid crystal display device include the dye method, the pigment dispersion method, the electro-deposition method, the print method, etc. The dye method and the pigment dispersion method have an advantage in that they form a fine pattern; but have a drawback in that, since they need a photo-etching process for each of the R, G and B color filters, the fabrication process is complicated and wastes material. The electro-deposition method also has a drawback in that, since an electro-deposition and a mounting process for each of the R, G and B color filters is repeated, it causes a complication in the fabrication process. The print method has a problem in that it is difficult to uniformly control the thickness of the color filters.

Recently, in order to overcome problems in such existent color filter fabrication methods, there has been developed a method for fabricating a color filter using an ink-jet system. This method is capable of easily fabricating fine patterns using a relatively simple process. In the ink-jet color filter fabrication method, a color filter is formed by defining a lattice-type barrier rib for providing a cell area on a transport substrate and thereafter ejecting ink onto the cell area.

Figure 1A:
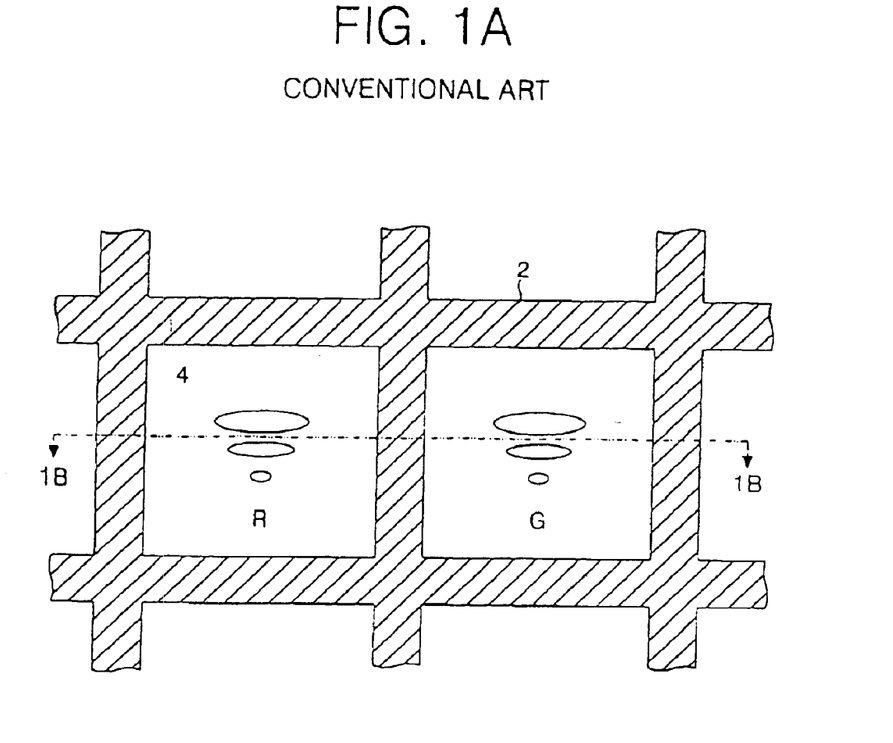
FIG. 1A and FIG. 1B are a plan view and a sectional view showing the structure of a color filter substrate in a liquid crystal display device with a conventional ink-jet color filter, respectively.
Figure 1B:
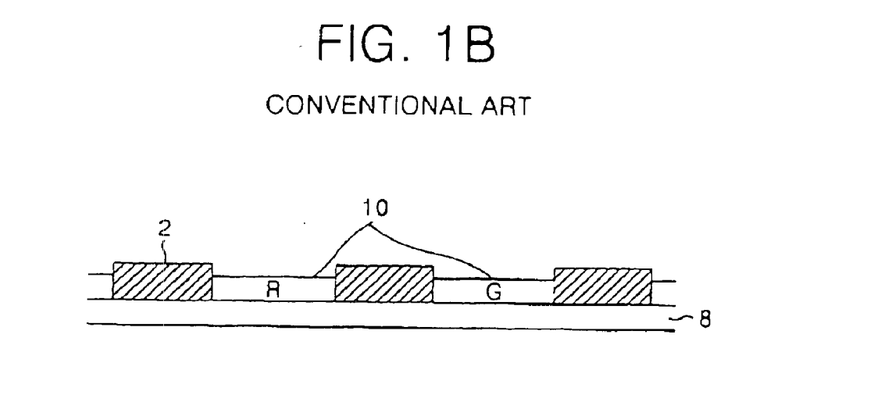

FIG. 1A is a plan view showing a color filter substrate in a liquid crystal display device with the conventional ink-jet color filter, and FIG. 1B is a sectional view of the color filter substrate taken along line 1B—1B in FIG. 1A. In FIGS. 1A and 1B, the color filter substrate includes a lattice-shaped barrier structure 2 provided on a transparent substrate 8, and a color filter 10 provided in a cell area 4 defined by the barrier structure 2. The barrier structure 2 is provided by forming a metal film such as Cr and the like or a black resin film on the transparent substrate 9 and thereafter patterning the film using photolithography, etc. This barrier structure 2 is intended to define the cell area 4 including the color filter 10, and is formed to overlap with gate and data wiring areas of a thin film transistor substrate opposed to the color filter substrate 8. The barrier structure 2 prevents the leakage of light and serves as a black matrix for absorbing external light, which increases contrast. The color filter 10 as shown in FIG. 1B is formed by injecting R, G and B inks into the cell area 4 and curing the ink. The color filter substrate 8 further includes common electrodes (not shown) over the barrier structure 2 and the color filter 10.

Figure 2A:
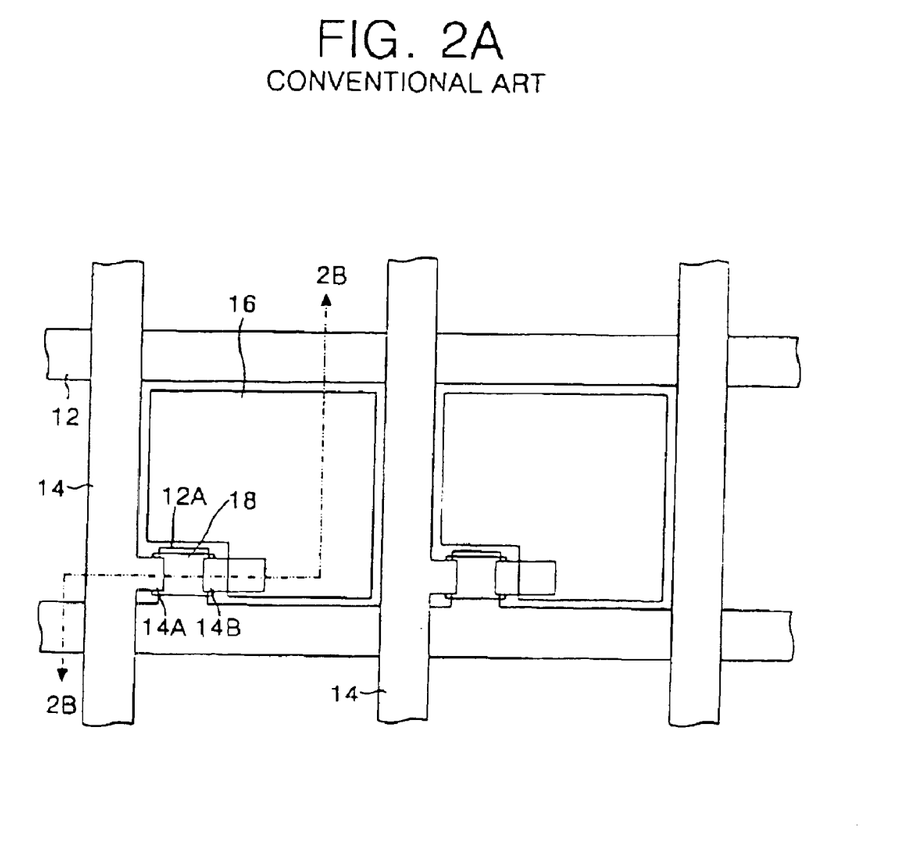
FIG. 2A and FIG. 2B are a plan view and a sectional view showing the structure of a thin film transistor substrate in a liquid crystal display device with a conventional ink-jet color filter, respectively.
Figure 2B:
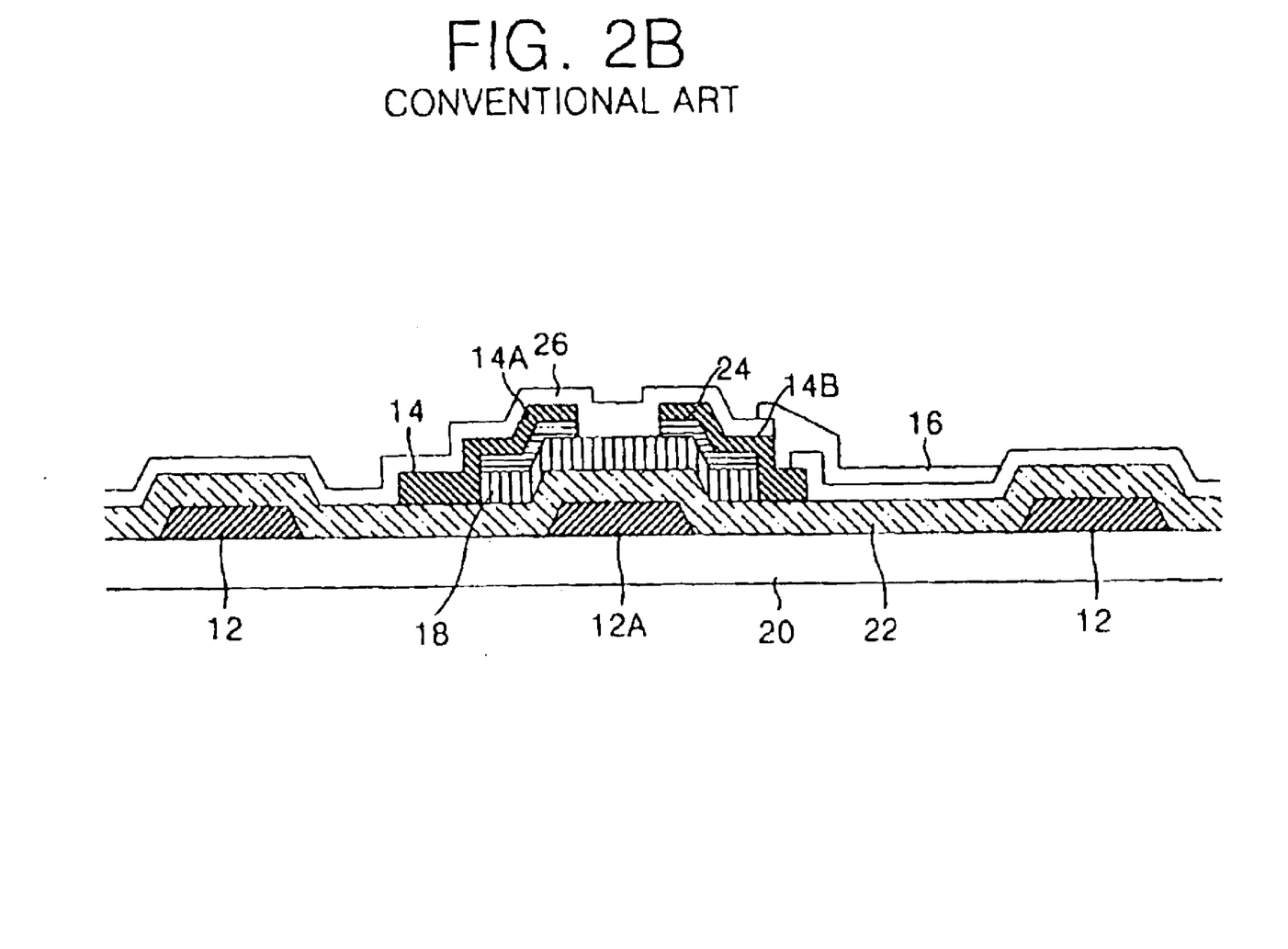

FIG. 2A is a plan view showing a thin film transistor substrate opposed to the above-mentioned color filter substrate, and FIG. 2B is a sectional view of the thin film transistor substrate taken along line 2B—2B in FIG. 2A. The thin film transistor substrate includes a thin film transistor, provided at an intersection between a gate line 12 and a data line 14, and a pixel electrode 16 connected to the thin film transistor. The thin film transistor consists of a gate electrode 12A protruding from the gate line 12, a source electrode 14A protruding from the data line 14, a drain electrode 14B connected to the pixel electrode 16, and an active layer 18 providing a conductive channel between the source electrode 14A and the drain electrode 14B. The pixel electrode 16 is positioned at the cell area defined by the gate line 12 and the data line 14 and is an ITO (indium thin oxide) electrode with a high light transmissivity.

A method of fabricating the thin film transistor substrate will be described below with reference to FIG. 2B. The gate line 12 and the gate electrode 12A are provided by depositing a metal material such as Al, Ta or Mo on a transparent substrate 20 and thereafter patterning the metal substrate. By fully coating an insulating material thereon, a gate insulation film 22 is formed. A channel layer 18 and an Ohmic contact layer 24 are provided by sequentially depositing an amorphous silicon layer and an impurity amorphous silicon layer on the gate insulation film 22 and thereafter patterning them. The data line 14 and the source and drain electrodes 14A and 14B are provided by depositing a metal material over the substrate 20 and patterning the metal material. Next, the Ohmic contact layer 24 exposed through the source and drain electrodes 14A and 14B is etched. A protective film 26 is provided by coating the entire substrate with an insulating material, and contact holes are defined by patterning the protective film 26. The pixel electrode 16 is providing by depositing a transparent electrode material on the protective film 26 and thereafter patterning the electrode material. This pixel electrode 16 is electrically connected to the drain electrode 14B via the contact holes provided in the protective film 26.

The conventional ink-jet color filter fabrication method as mentioned above has an advantage over other existent color filter fabrication methods in that the fabrication process is relatively simple because the color filter is formed by the ink-jet system. The liquid crystal display device with the conventional ink-jet color filter, however, has a difficulty in that an ink ejection time must be discretely or discontinuously controlled because ink is injected in each cell area 4 of the lattice-shaped barrier structure 2.

SUMMARY OF THE INVENTION

Accordingly, it is an object of the present invention to provide a liquid crystal display device with an ink-jet color filter that permits continuous ink ejection.

A further object of the present invention is to provide a simplified method of fabricating a liquid crystal display device that forms an ink-jet color filter through continuous ink ejection.

Yet another object of the present invention is to provide a simplified method of fabricating a liquid crystal display device with an ink-jet color filter that reduces manufacturing cost by making a color filter using an ink-jet system without a separate barrier structure fabrication process.

These and other objects are achieved by providing a liquid crystal display device, comprising a first substrate; a plurality of gate lines formed on said first substrate; a plurality of data lines, electrically insulated from said plurality of gate line, formed on said first substrate such that said plurality of data lines intersect with said plurality of gate lines to define cell areas; a pixel electrode formed in each of said cell areas; a transistor associated with each pixel electrode, said transistor having a gate, source and drain, said drain connected to said pixel electrode, said source connected to one of said plurality of data lines, and said gate connected to one of said plurality of gate lines; barrier ribs formed on said source and drain of each transistor; and an ink-jet color filter formed in each cell area between said barrier ribs.

These and other objects are also achieved by providing a liquid crystal display device, comprising a first substrate; barrier lines formed in a first direction over said first substrate, adjacent barrier lines defining a column area; an ink-jet color filter formed in at least one of said column areas.

These and other objects are further achieved by providing a method of fabricating a liquid crystal display device, comprising forming gate lines and at least one gate electrode connected to one of said gate lines on a substrate; forming an insulation layer over said substrate; forming an active layer over said gate electrode; forming a metal layer over said substrate; forming barrier lines on said metal layer; patterning said metal layer using said barrier lines as a mask to form source and drain electrodes on said active region and to form data lines; forming a color filter between at least two adjacent barrier lines using ink ejection; and forming a pixel electrode connected to said drain electrode.

These and other objects are still further achieved by providing a method of fabricating a liquid crystal display device, comprising forming a first insulation layer on a substrate; forming an active layer on said insulation layer; forming a second insulation layer over said substrate; forming gate lines and a gate electrode, connected to one of said gate lines and disposed over said active layer, on said second insulation layer; forming a protective film over said substrate; forming source and drain electrodes, in electrical contact with source and drain regions of said active layer, on said protective film; and forming barrier lines on said source and drain electrodes; forming a color filter between at least two adjacent barrier lines using ink ejection; removing said barrier lines; forming a pixel electrode connected to said drain electrode; and forming light shielding lines over said source and drain electrodes.

These and other objects are yet further achieved by providing a method of fabricating a liquid crystal display device, comprising forming a transistor structure on a substrate, said transistor structure including source and drain electrodes connected to an active region; and forming barrier lines on said source and drain electrodes; and forming a color filter between at least two adjacent barrier lines using ink ejection; and forming a pixel electrode connected to said drain electrode.

These and other objects are also achieved by providing a method of fabricating a liquid crystal display device, comprising forming a plurality of barrier lines on a first substrate; and forming a color filter between at least two adjacent barrier lines using ink ejection.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 3A:
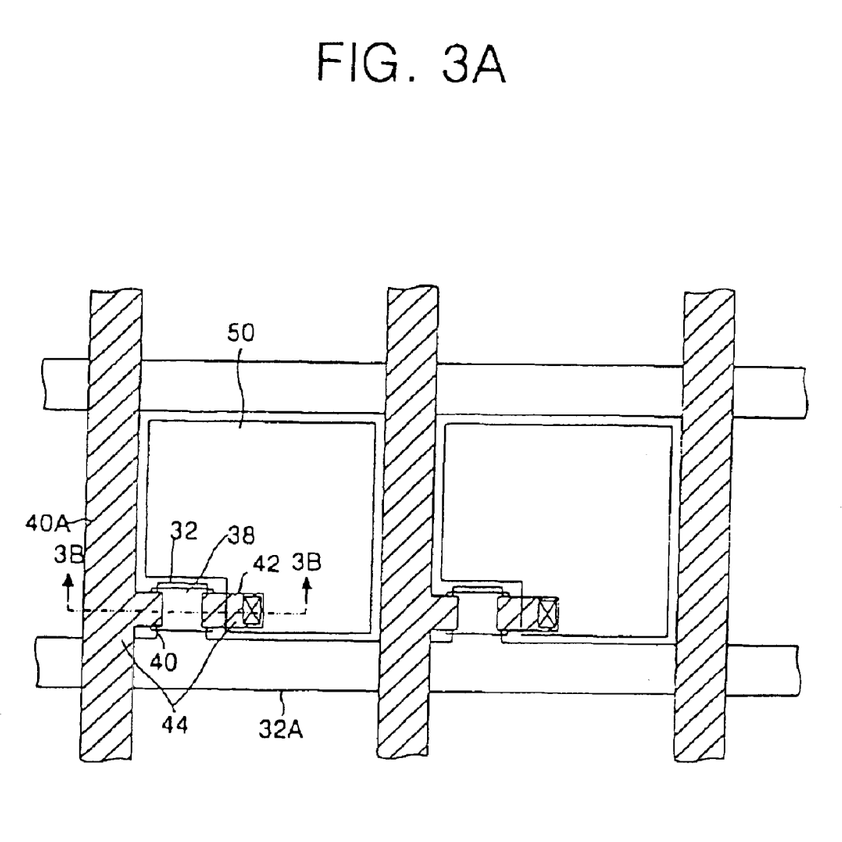
FIG. 3A is a plan view showing the structure of a liquid crystal display device with an ink-jet color filter according to an embodiment of the present invention.
Figure 3B:
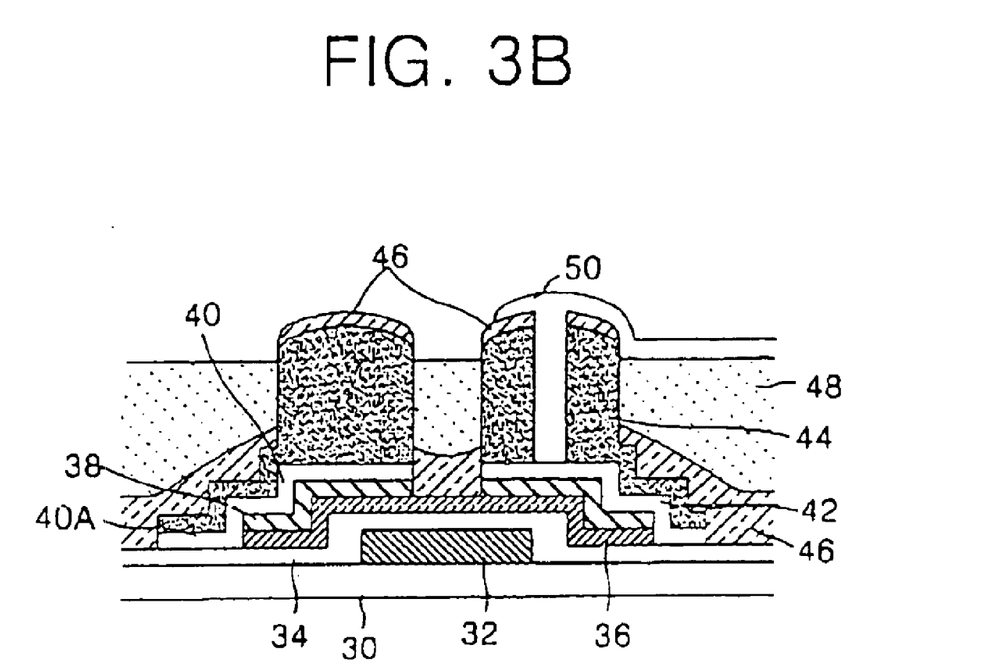
FIG. 3B is a sectional view showing the structure of a liquid crystal display device with an ink-jet color filter according to an embodiment of the present invention.

FIG. 1A is a plan view showing a liquid crystal display device with an ink-jet color filter according to an embodiment of the present invention. FIG. 3B is a sectional view of the liquid crystal display device taken along line 3B—3B in FIG. 3A. In FIGS. 3A and 3B, the liquid crystal display device with the ink-jet color filter includes thin film transistors provided at each intersections of gate lines 32A and data lines 40A, barrier ribs 44 formed in the same pattern as a source electrode 40 and a drain electrode 42 of the thin film transistor, a color filter 48 provided between the barrier ribs 44, and a pixel electrode 50 provided on the upper portion of the color filter 48. The thin film transistor consists of a gate electrode 32 extended from the gate line 32A, a source electrode extended from the data line 40A, and an active layer 36 providing with a current channel between the source and drain electrodes 40 and 42.

The barrier ribs 44 are photo-resist patterns defined on a data line 40A, the source and drain electrodes 40 and 42 so as to make a pattern with a stripe-shape like the data line. The photo-resist patterns are used to form the data line 40A, the source and drain 40 and 42. The color filters 48 can be provided by a continuous ejection method unlike the prior art as the barrier ribs 44 for separating individual colors of the color filters 48 have a stripe-shape. As a result, each of R, G and B color filters 48 has an integral column structure.

A protective film 46 is provided on the upper surface of the barrier ribs 44 and at the lower portions of the color filters 48. The pixel electrode 50 is formed at the cell area and is electrically connected to the drain electrode 42 via a contact hole passing through the barrier ribs 44 and the protective film 46 over the drain electrode 42.

Figure 4A:
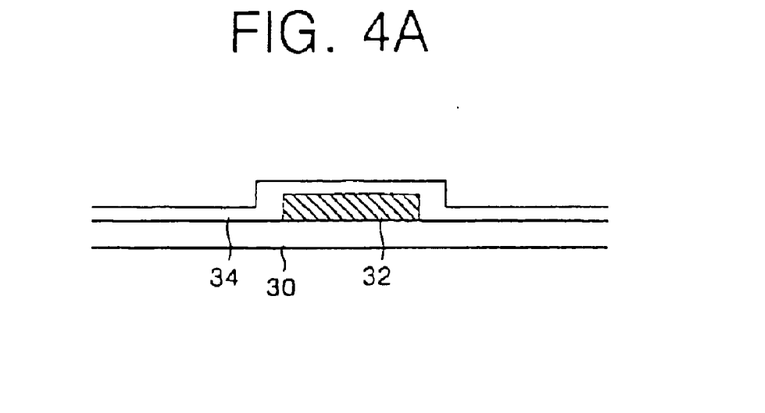
FIG. 4A to FIG. 4F are sectional views representing a fabrication process of a liquid crystal display with an ink-jet color filter according to an embodiment of the present invention.

Hereinafter, a method of fabricating the liquid crystal display device with an ink-jet color filter shown in FIG. 3B will be described with reference to FIG. 4A to FIG. 4F. Referring to FIG. 4A, the gate electrode 32 and the gate insulation film 34 are formed on the transparent film 30. The gate electrode 32 is provided along with the gate line (not shown) by depositing a metal material such as Mo, Ta, or Al alloy, etc. on the transparent substrate 30 using the sputtering technique and thereafter patterning the metal material using photolithography. The gate insulation film 34 is provided by depositing an insulating material such as SiNx or SiOx, etc. over the entire surface of the transparent substrate 30 using the CVD (plasma chemical vapor deposition) technique.

Figure 4B:
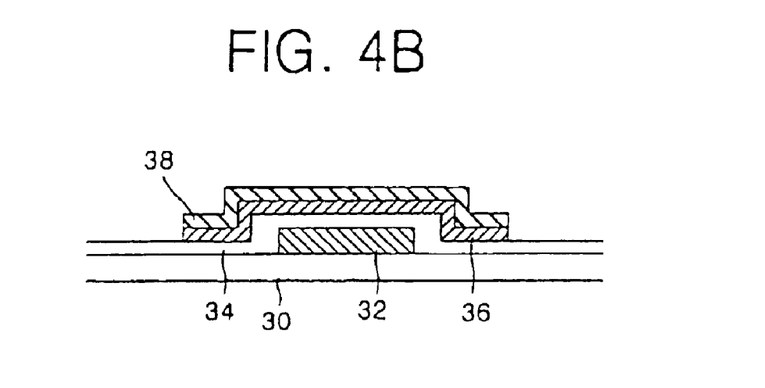

After the gate insulation film 34 is provided, the active layer 36 and the Ohmic contact layer 38 are sequentially disposed thereon as shown in FIG. 4B. The active layer 36 and the Ohmic contact layer 38 are provided by sequentially depositing an amorphous silicon layer and an impurity amorphous silicon layer on the gate insulation film 34 using the CVD technique and thereafter patterning them.

Figure 4C:
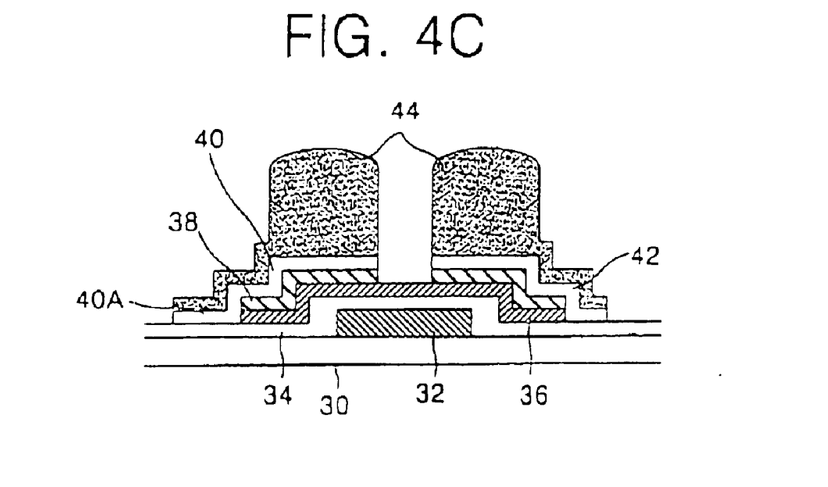

After the Ohmic contact layer 38 is provided, the source and drain electrodes 40 and 42 and the barrier ribs 44 are sequentially disposed thereon as shown in FIG. 4C. The source and drain electrodes 40 and 42 are provided along with the data line (not shown) by depositing a metal material such as Al, Cr, Ti or Al alloy, etc. using the sputtering technique and thereafter patterning the metal material using photolithography. A channel layer 36 is exposed by etching the Ohmic contact layer 38 exposed between the source and drain electrodes 40 and 42. The barrier ribs 44 are photo-resist patterns used for patterning the source and drain electrodes 40 and 42. More specifically, after the metal layer was formed, a photo-resist made from a highly polymerized compound such as acryl is deposited. Next, photo-resist patterns 44 are formed by (1) exposing the photo-resist to the light using a photo mask and (2) etching the photo-resist. The source and drain electrodes 40 and 42 and the data line corresponding to a shape of the photo-resist pattern 44 are formed by etching a metal layer at the lower portions of the photo-resist patterns 44. The photo-resist pattern 44 then serves as the barrier ribs 44 for separating the color filters in the later color filter fabrication process. Also, the photo-resist pattern 44 serves as a black matrix for preventing the leakage of light at the data line area. The black matrix for preventing the leakage of light in the data line area may be formed in the course of patterning the photo-resist or by a separate process.

Figure 4D:
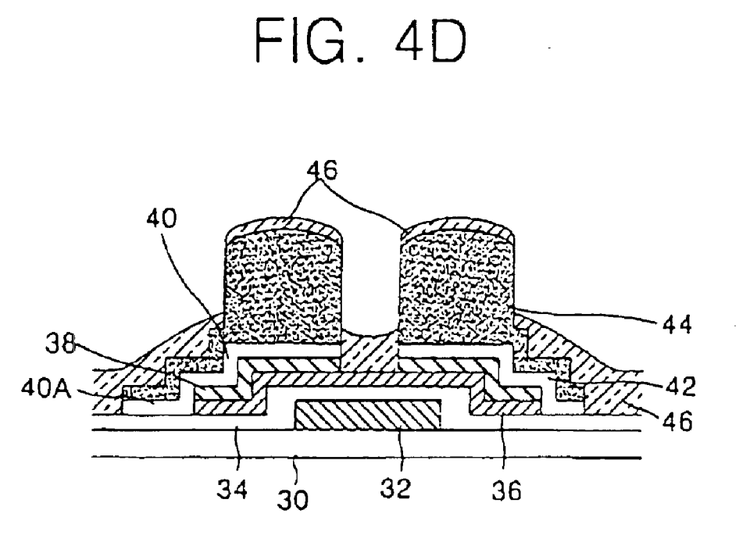

Subsequently, as shown in FIG. 4D, the protective film 46 is formed over the entire substrate 30. As shown, the protective film 46 has poor step coverage, but the present invention is not limited to such a protective film 46. The protective film 46 is provided by coating the entire substrate 30 with an inorganic material such as $SiN_x$ or $SiO_x$, etc. or an organic material such as BCB (benzocyclobutane), etc. In this case, the protective film 46 serves as a repellent by treating the protective film 46 with a fluorine-group impurity.

Figure 4E:
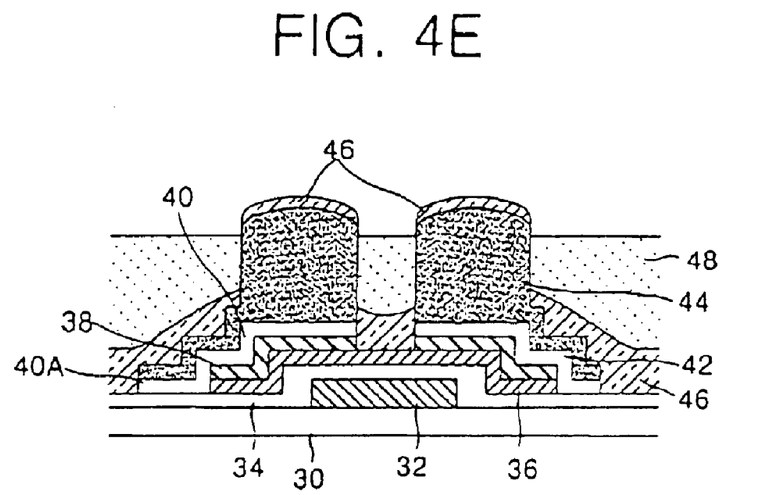

After the protective film 46 is formed, the color filters 48 are provided thereon as shown in FIG. 4E. The color filters are provided by ejecting inks for R, G and B color filters between the barrier ribs 44 using the ink-jet method and thereafter curing the ink. More specifically, the barrier ribs 44 on the data lines define a column between adjacent barrier ribs 44, as opposed to cells in the conventional art. Therefore, a particular color of ink (R, G or B) is continuously supplied for the length of the column (i.e., the equivalent of numerous cells in the conventional art). This greatly simplifies the fabrication process as compared to the discontinuous ink supply method of the conventional art.

Figure 4F:
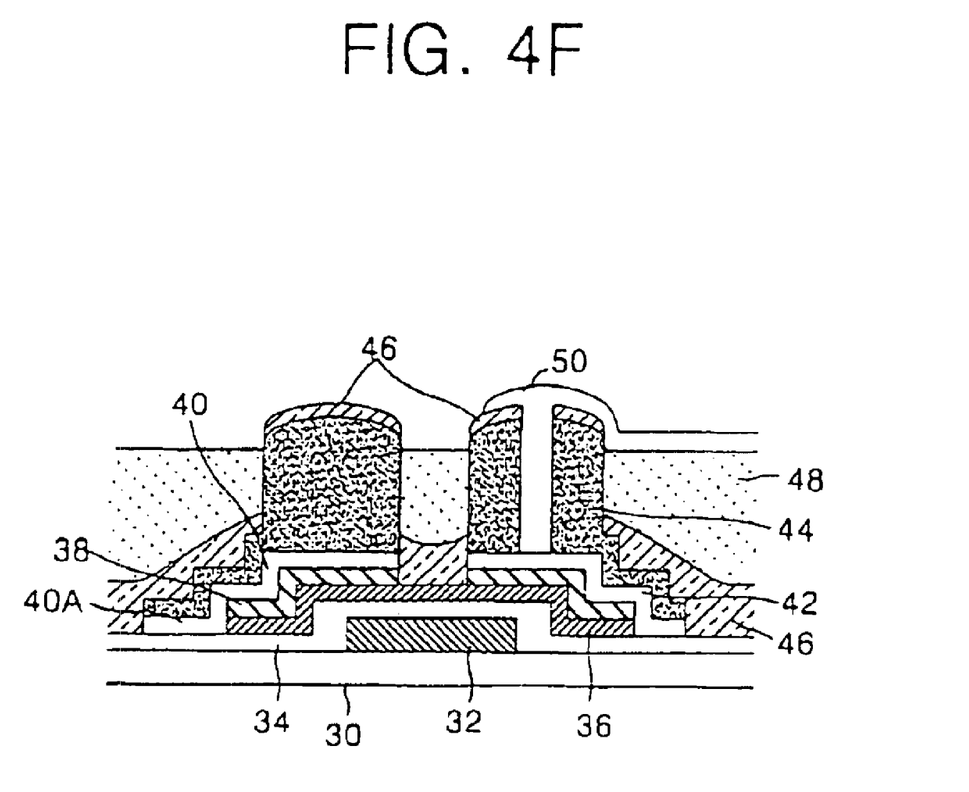

After the color filters 48 are formed, the pixel electrode 50 is provided as shown in FIG. 4F. More specifically, after the color filters 48 are formed, a contact hole passing through the barrier ribs 44 and the protective film 46 and exposing the drain electrode 42 is formed. Then, the pixel electrode 50 is formed by coating the entire substrate 30 with a transparent conductive material such as ITO using the sputtering technique and thereafter patterning the conductive material using photolithography.

On the lower substrate 30 formed in this manner, an orientation film (not shown) for orienting the liquid crystal molecules is further provided. On the upper substrate, opposed to the lower substrate 30, a common electrode, for driving a liquid crystal layer with a voltage difference from the pixel electrode, and an orientation film, for making an orientation of the liquid crystal molecules, are disposed. Between the upper and lower substrates is provided a liquid crystal layer for controlling the light transmissivity in accordance with a voltage applied to the pixel electrode 50.

Figure 5:
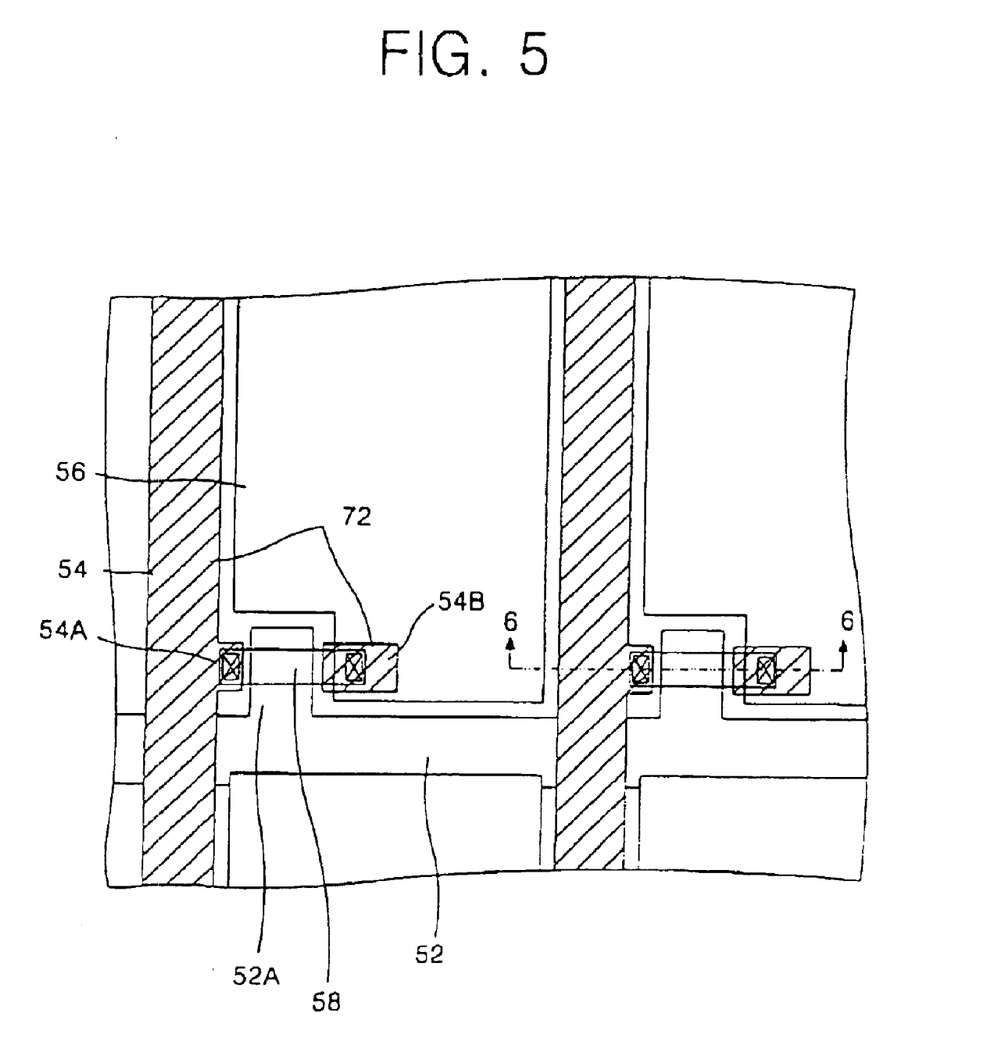
FIG. 5 is a plan view showing the structure of a liquid crystal display device with an ink-jet color filter according to another embodiment of the present invention.

Referring now to FIG. 5, there is shown a liquid crystal display device with an ink-jet color filter according to another embodiment of the present invention. The liquid crystal display device includes thin film transistors using multiple crystalline silicon having a higher mobility of electron charge than amorphous silicon as an active layer. The thin film transistor includes an active layer 58 made from multiple crystalline silicon, a gate electrode 52A positioned at the upper portion of the active layer 58 and protruding from the gate line 52, a source electrode 54A connected to the source area of the active layer 58 and protruding from a data line 54, and a drain electrode connected to the drain area of the active layer 58. The source electrode 54A and the drain electrode 54B are positioned not to overlap with each other. The pixel electrode 56 is positioned at a cell area defined by the gate lines 52 and the data lines 54, and is connected, via a contact hole, to the drain electrode 54B.

Figure 6A:
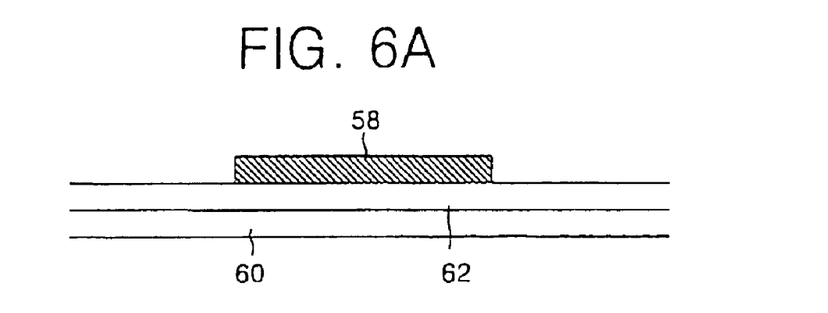
FIG. 6A to FIG. 6E are sectional views representing a fabrication process of a liquid crystal display with an ink-jet color filter according to another embodiment of the present invention.

FIG. 6A to FIG. 6E are sectional views along line 6—6 in FIG. 5 for explaining a process of fabricating the liquid crystal display device shown in FIG. 5. Referring to FIG. 6A, a buffer insulating film 62 and the active layer 58 are formed on a transparent substrate 60. The buffer insulating film 62 is provided by entirely coating an insulating material such as $SiO_x$ on the transparent substrate 60. The active layer 58 is provided by depositing amorphous silicon on the upper portion of the buffer insulating film 62, crystallizing the amorphous silicon using a laser to form a multiple crystalline silicon film, and then patterning the multiple crystalline silicon film (i.e., polysilicon).

Figure 6B:
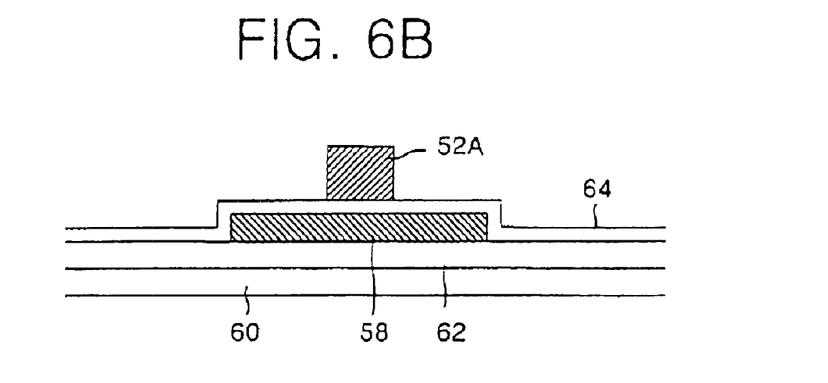

After the active layer 58 is formed, the gate insulation film 64 and the gate electrode 52A are formed as shown in FIG. 6B. The gate insulation film 64 is provided by depositing an insulating material such as $SiN_x$ or $SiO_x$, etc. on the buffer insulating film 62 in such a manner to cover the active layer 58 using the plasma CVD technique. The gate electrode 52A is provided along with a gate line (not shown) by depositing a metal material such as Al, Mo, Ta or Al alloy, etc. using the sputtering technique and thereafter patterning the metal material using photolithography.

Figure 6C:
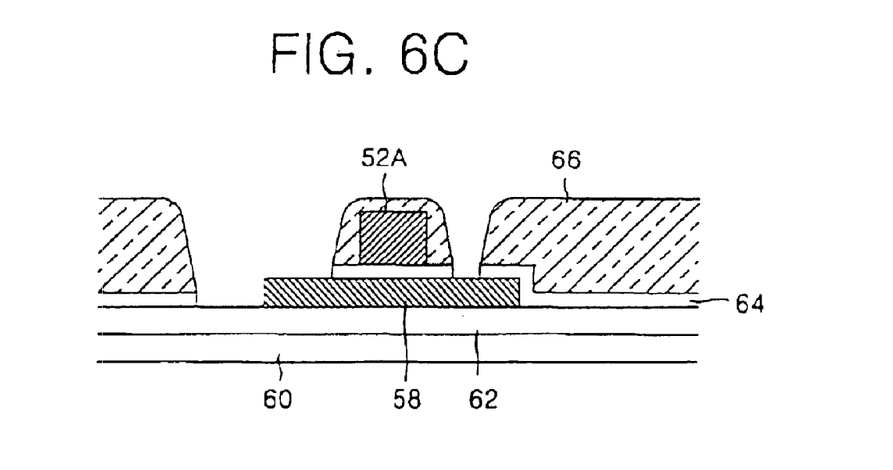

Next, the protective film 66 is formed as shown in FIG. 6C. The protective film 66 is formed by coating the entire substrate 60 with an inorganic material such as $SiN_x$ or $SiO_x$, etc. or an organic material such as BCB (benzocyclobutane), etc. Then, contact holes for exposing the source and drain areas, respectively, of the active layer 58 are formed by patterning the protective film 66 and the gate insulation film 64.

Figure 6D:
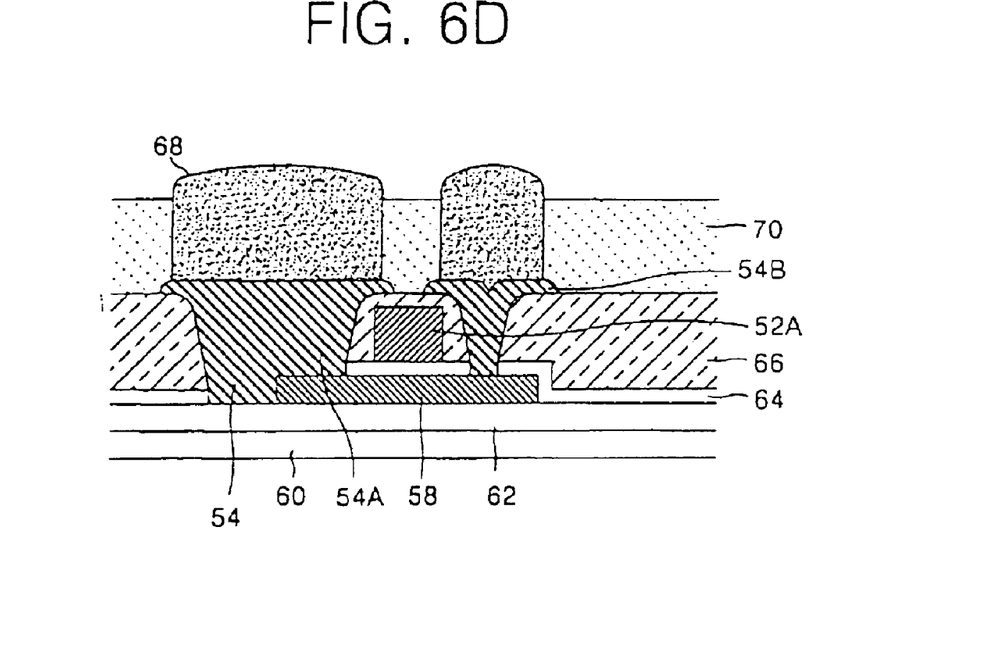

Then, the source and drain electrodes 54A and 54B, the photo-resist pattern 68 and the color filter 70 are formed as shown in FIG. 6D. The source and drain electrodes 54A and 54B are formed along with the data line (not shown) by depositing a metal material such as Al, Cr, Ti or Al alloy, etc. using the sputtering technique and thereafter patterning the metal material using photolithography. More specifically, after the metal layer is formed, a photo-resist made from a highly polymerized compound such as acryl is deposited. Next, a photo-resist patterns 68 are formed by exposing the photo-resist to the light using a photo mask and etching the photo-resist. The source and drain electrodes 54A and 54B and the data line corresponding to a shape of photo-resist pattern 68 are formed by etching the metal layer at the lower portions of the photo-resist patterns 68. In this case, the source and drain electrodes 54A and 54B are connected to the source and drain areas of the active layer 58 via contact holes passing through the protective film 66 and the gate insulating film 64. The photo-resist pattern 68 then serves as the barrier ribs for separating the color filters in the later color filter fabrication process. The color filters 70 are provided by ejecting the inks for R, G and B color filters between the photo-resist pattern 68 using the ink-jet method and thereafter curing the ink. As with the previous embodiment, the barrier ribs 68 define columns in which ink is continuously supplied to form the color filters 70. This greatly simplifies the fabrication process.

Figure 6E:
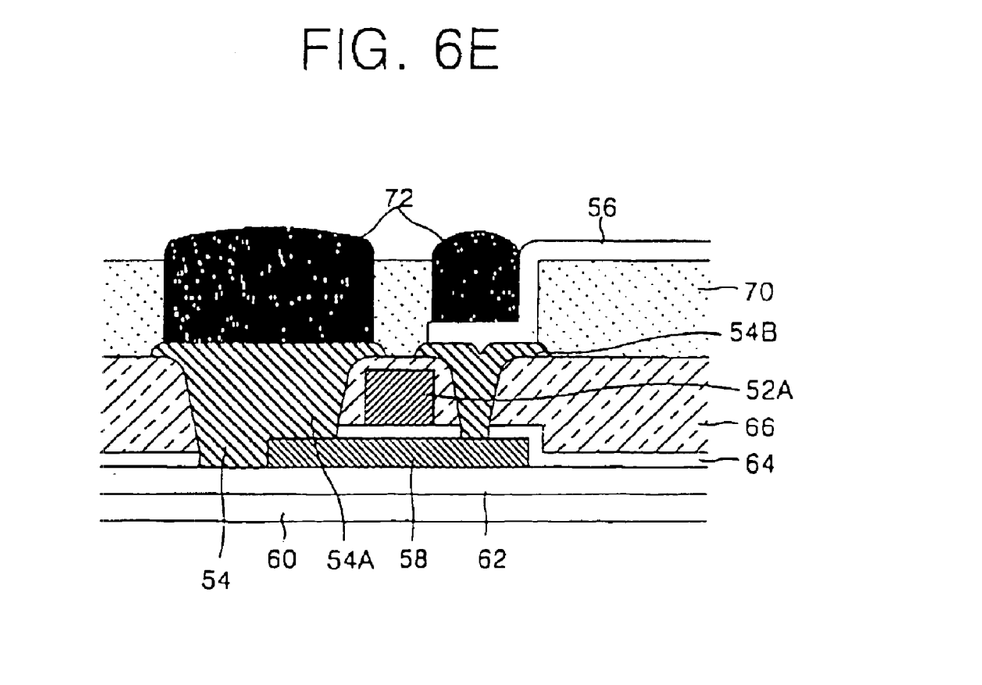

Next, the pixel electrode 56 and the black matrix 72 are provided as shown in FIG. 6E. First, the photo-resist pattern 68 is removed. Then, the pixel electrode 56 is formed by coating the entire substrate 60 with a transparent conductive material such as ITO using the sputtering technique and thereafter patterning the conductive material using photolithography. In this case, the pixel electrode 56 is connected to the drain electrode 54B. The black matrix 72 is formed by coating the entire substrate 60 with a black resin and thereafter patterning the black resin. This black matrix prevents the leakage of light from the data line and gate line areas.

On the lower substrate 60 formed in this manner, an orientation film (not shown) for orienting liquid crystal molecules is further provided. On the upper substrate, opposed to the lower substrate 60, a common electrode, for driving a liquid crystal layer with a voltage difference from the pixel electrode, and an orientation film, for making an orientation of the liquid crystal molecules, are disposed. Between the upper and lower substrates is provided a liquid crystal layer for controlling the light transmissivity in accordance with a voltage applied to the pixel electrode 56.

As an alternative, the black matrix 72 is provided on the upper substrate. In this case, the pixel electrode 56 is provided on the protective film 66.

Figure 7:
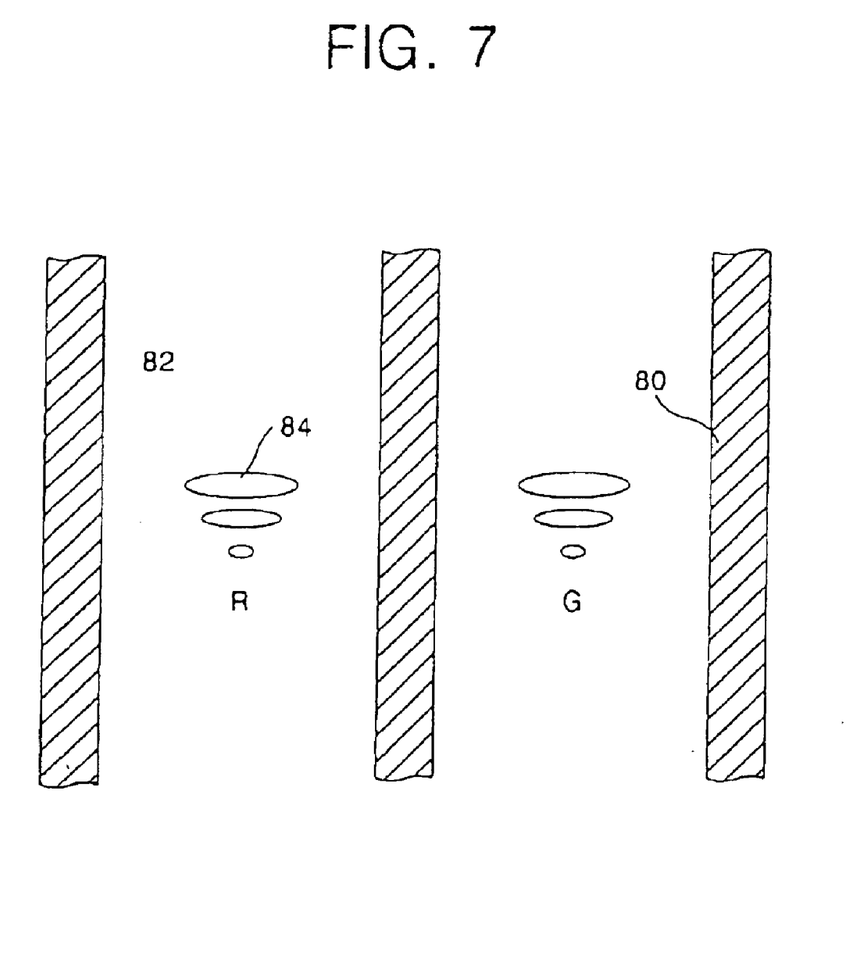
FIG. 7 is a plan view showing the structure of a liquid crystal display device with an ink-jet color filter according to still another embodiment of the present invention.

FIG. 7 is a plan view representing the upper substrate of a liquid crystal display device with an ink-jet color filter according to another embodiment of the present invention. In FIG. 7, the upper substrate of the liquid crystal display device includes stripe-shaped barrier ribs 80 provided on a transparent substrate, and color filters 80 provided between the barrier ribs 80. The barrier ribs 80 are formed by forming a metal film such as Cr and the like or a black resin film on the transparent substrate and thereafter patterning the material using photolithography, etc. These barrier ribs 80 divide the substrate 82 into column areas to contain R, G and B color filters 82. The barrier ribs 80 have a stripe-shape to overlap with the data lines of a lower substrate. In this case, the barrier ribs 80 prevent the leakage of light from the data lines and thin film transistor areas, and serve as a black matrix for absorbing external light to increase contrast. The R, G and B color filters are provided by injecting R, G and B ink 84 between the barrier ribs 60 and curing the ink. In this case, each of the color filters 84 may be formed through continuous ink ejection, unlike the prior art. As a result, each of the R, G and B color filters 82 has an integral column structure. The upper substrate further includes a common electrode and an orientation film (not shown) over the barrier ribs 80 and the color filter 82.

In an alternative embodiment, the barrier ribs 80 are formed to overlap with the gate lines, and not the data lines of a lower substrate as described above.

Figure 8A:
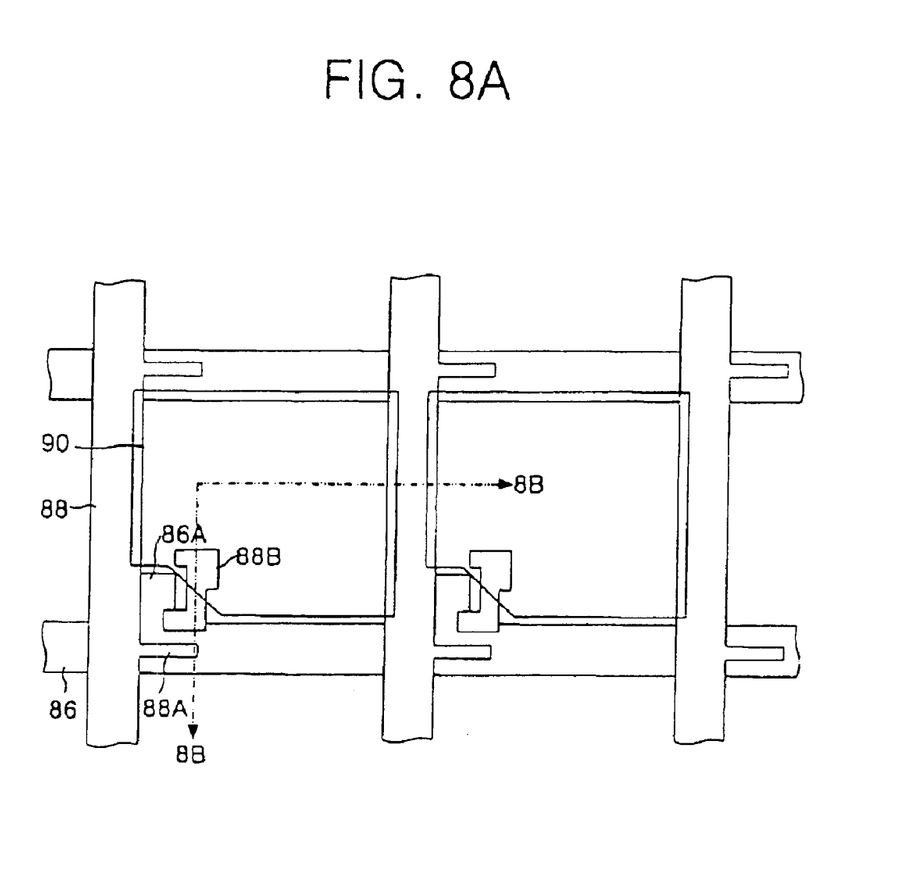
FIG. 8A and FIG. 8B are a plan view and a sectional view showing the structure of a thin film transistor substrate opposed to the color filter substrate in FIG. 7.
Figure 8B:
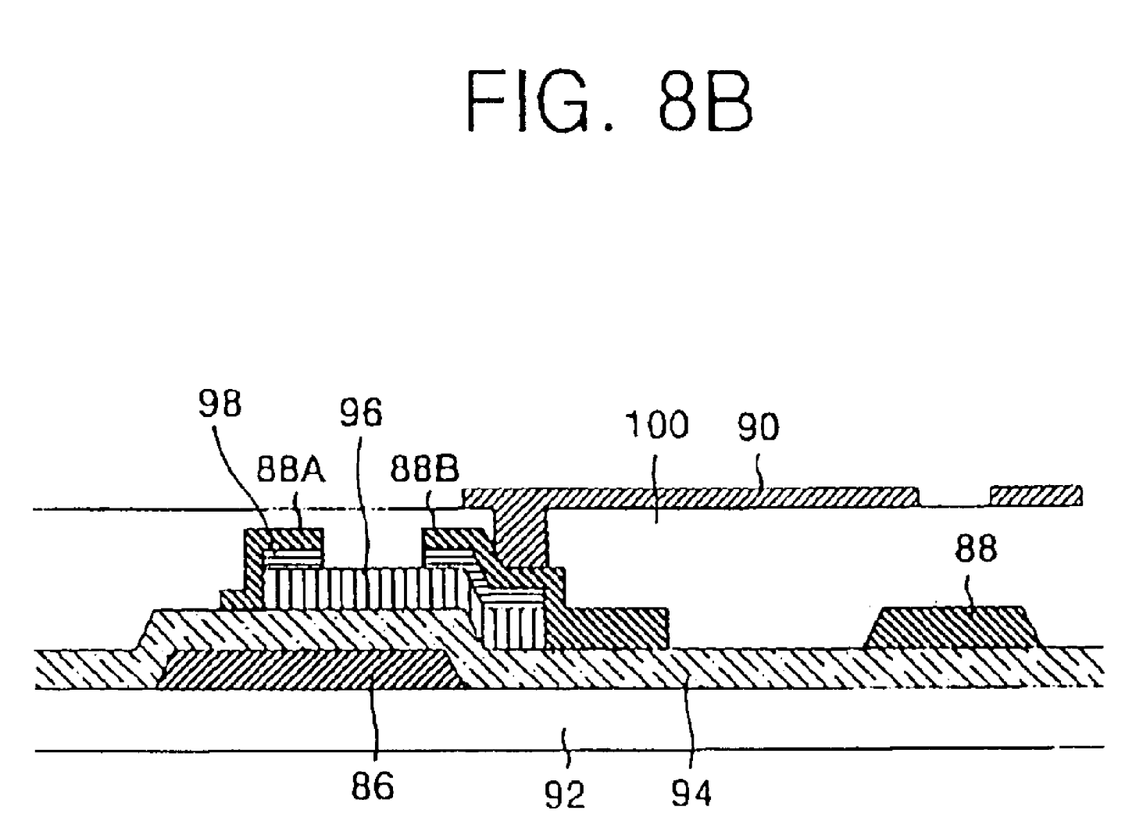

FIG. 8A is a plan view showing the lower substrate opposed to the upper substrate 82 in FIG. 7, and FIG. 8B is a sectional view of the lower substrate taken along line 8B—8B in FIG. 8A. The lower substrate 92 includes a thin film transistor provided at an intersection between a gate line 86 and a data line 88, and a pixel electrode 90 connected to the thin film transistor. The thin film transistor consists of a gate electrode 86A protruding from the gate line 86, a source electrode 88A protruding from the data line 88, a drain electrode 88B connected to the pixel electrode 90, and an active layer (not shown in FIG. 8A) for providing a conductive channel between the source electrode 88A and the drain electrode 88B.

The pixel electrode 90 is positioned at the cell area defined by the gate lines 86 and the data lines 88 such that one side thereof overlaps with a gate line 86 and a data line 88. In this case, such overlapping between the pixel electrode 90 and the gate and data lines 86 and 88 is made by forming an organic film having a low dielectric constant that acts as a protective film to minimize a coupling effect caused by a parasitic capacitance. The gate line 86 and the data line 88 serves as a black matrix in view of the electrode overlap, so that the leakage of light from the electrode line area is prevented without a separate black matrix. Also, as an area occupied by the pixel electrode increases due to electrode overlap, the aperture rate of the liquid crystal display can be enlarged.

A method of fabricating the lower substrate will be described below with reference to FIG. 8B. The gate line 86 and the gate electrode 86A are formed by depositing a metal material such as Al, Ta or Mo on a transparent substrate 92 and thereafter patterning the metal material. By fully coating an insulating material thereon, a gate insulation film 94 is formed. A channel layer 96 and an Ohmic contact layer 98 are formed by sequentially depositing an amorphous silicon layer and an impurity amorphous silicon layer on the gate insulation film 94 and thereafter patterning them. The data line 88 and the source and drain electrodes 88A and 88B are formed by depositing a metal material over the gate insulation film 94 and patterning the metal material. Next, the Ohmic contact layer 98 exposed through the source and drain electrodes 88A and 88B is etched. A protective film 100 is formed by coating the entire substrate 92 to a sufficient thickness with an insulating material, and a contact hole is defined by patterning the protective film 100. The pixel electrode 90 is formed by depositing a transparent electrode material on the protective film 100 and thereafter patterning the electrode material. This pixel electrode 90 is electrically connected to the drain electrode 88B via the contact hole provided in the protective film 100. Also, the pixel electrode 90 is formed to overlap with the gate line 86 and the data line 88 by a desired width, so that the gate line 86 and the data line 88 serve as part of a black matrix.

Alternatively, the leakage of light may be prevented by further providing the areas of the gate line 86 and the data line 88 with a low reflective layer.

At the upper portion of the lower substrate 92, an orientation film (not shown) is further included to determine an orientation direction of liquid crystal molecules. Between the upper and lower substrates is provided a liquid crystal layer for controlling the light transmissivity in accordance with a voltage applied to the pixel electrode 90.

As described above, according to the present invention, a column-shaped color filter is made by continuous ink ejection simplifying the fabrication process. Also, the photoresist pattern for the source/drain electrode pattern is used as the barrier structure without a separate barrier structure formation process, so that the fabrication process is further simplified. Accordingly, the liquid crystal display device with the ink-jet color filter according to the present invention reduces manufacturing cost.

Although the present invention has been explained by the embodiments shown in the drawings described above, it should be understood by the ordinary skilled person in the art that the invention is not limited to the embodiments, but rather, various changes or modifications thereof are possible without departing from the spirit of the invention. Accordingly, the scope of the invention should be determined by the appended claims and their equivalents.

What is claimed is:

1. A liquid crystal display device, comprising:
   a first substrate;
   a plurality of gate lines formed on said first substrate;
   a plurality of data lines, electrically insulated from said plurality of gate lines, formed on said first substrate such that said plurality of data lines intersect with said plurality of gate lines to define cell areas;
   a pixel electrode formed in each of said cell areas;
   a transistor associated with each pixel electrode, said transistor having a gate, source and drain, said drain connected to said pixel electrode, said source connected to one of said plurality of data lines, and said gate connected to one of said plurality of gate lines;
   barrier ribs formed on said source and drain of each transistor;
   an ink-jet color filter formed in each cell area between said barrier ribs, and said pixel electrode in each cell area is formed on said ink-jet color filter in said cell area; and
   a protective layer formed in a portion of each cell area, wherein
   said ink-jet color filter formed in each cell area is formed on said protective layer.

2. The liquid crystal display device of claim 1, wherein said barrier ribs are a photo-resist pattern for forming said data line and said source and drain.

3. The liquid crystal display device of claim 1, wherein
   at least one of said barrier ribs formed on one of said drains has a contact hole formed therein to expose said drain; and said pixel electrode associated with said transistor having said exposed drain is connected to said exposed drain via said contact hole.

4. The liquid crystal display device of claim 1, wherein said barrier ribs prevent light from leaking there through.

5. The liquid crystal display device of claim 1, wherein said barrier ribs have a stripe-shape in a direction parallel to said plurality of data lines.

6. The liquid crystal display device of claim 5, wherein
   said barrier ribs adjacent to one another and associated with different transistors define a column area, said column area including a plurality cell areas; and
   said ink-jet color filter is formed in one of said column areas.

7. The liquid crystal display device of claim 1, further comprising:
   a second substrate opposed to said first substrate; and
   liquid crystal disposed between said first and second substrates.

8. A method of fabricating a liquid crystal display device, comprising:
   forming gate lines and at least one gate electrode connected to one of said gate lines on a substrate;
   forming an insulation layer over said substrate;
   forming an active layer over said gate electrode;
   forming a metal layer over said substrate;
   forming barrier lines on said metal layer;
   patterning said metal layer using said barrier lines as a mask to form source and drain electrodes on said active region and to form data lines;
   forming a color filter between at least two adjacent barrier lines using ink ejection; and
   forming a pixel electrode connected to said drain electrode.

9. A method of fabricating a liquid crystal display device, comprising:
   forming a first insulation layer on a substrate;
   forming an active layer on said insulation layer;
   forming a second insulation layer over said substrate;
   forming gate lines and a gate electrode, connected to one of said gate lines and disposed over said active layer, on said second insulation layer;
   forming a protective film over said substrate;
   forming source and drain electrodes, in electrical contact with source and drain regions of said active layer, on said protective film;
   forming barrier lines on said source and drain electrodes;
   forming a color filter between at least two adjacent barrier lines using ink ejection;
   removing said barrier lines;
   forming a pixel electrode connected to said drain electrode; and
   forming light shielding lines over said source and drain electrodes.

10. The liquid crystal display device of claim 1, further comprising: a gate insulation film covering said plurality of gate lines on the first substrate, wherein the protective layer is disposed between the gate insulation film and the ink-jet color filter.

* * * * *